M. H. AVRAM.
BRICK PRESS.
APPLICATION FILED DEC. 10, 1914.

1,239,072.

Patented Sept. 4, 1917.
14 SHEETS—SHEET 1.

M. H. AVRAM.
BRICK PRESS.
APPLICATION FILED DEC. 10, 1914.

1,239,072.

Patented Sept. 4, 1917.
14 SHEETS—SHEET 4.

Fig. 5ᵃ.

Witnesses:
Edward Schorr.
H. R. Schulz.

Inventor
Mois H. Avram
By his Attorney
Arthur E. Zumpe

M. H. AVRAM.
BRICK PRESS.
APPLICATION FILED DEC. 10, 1914.
1,239,072.
Patented Sept. 4, 1917.
14 SHEETS—SHEET 5.
Fig. 6.
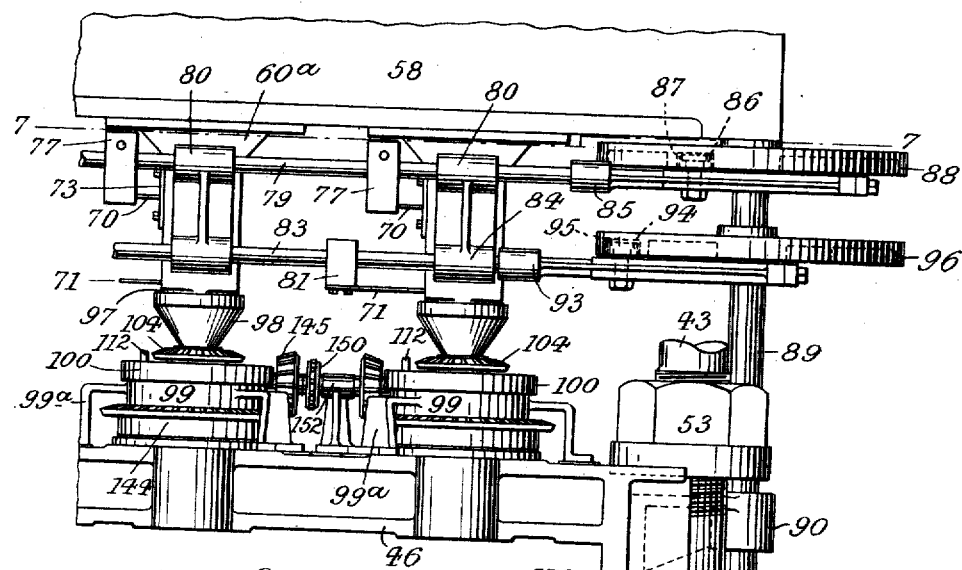
Fig. 8.
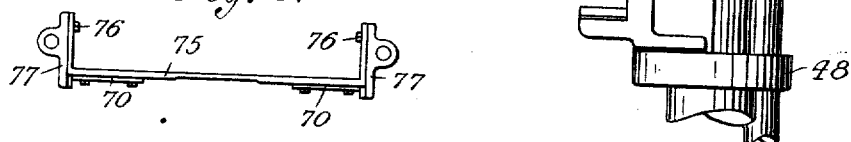
Fig. 7.
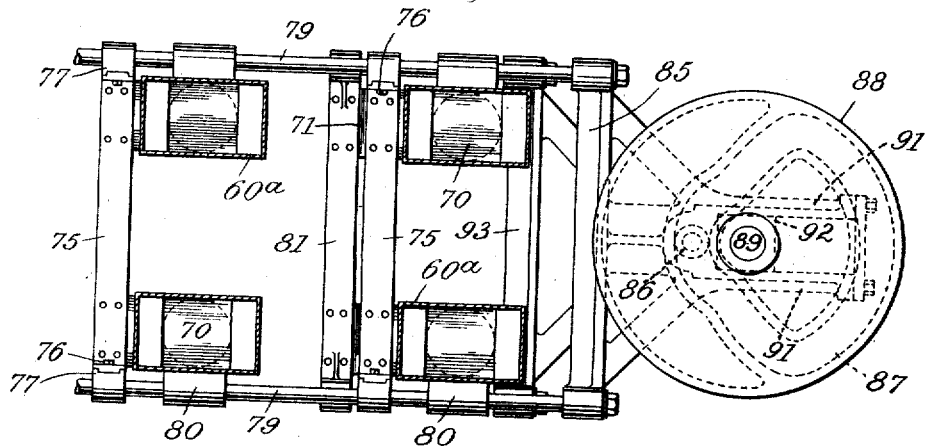
Fig. 9.
Witnesses:
Inventor
Mois H. Avram
By his Attorney
Arthur E. Zumpe

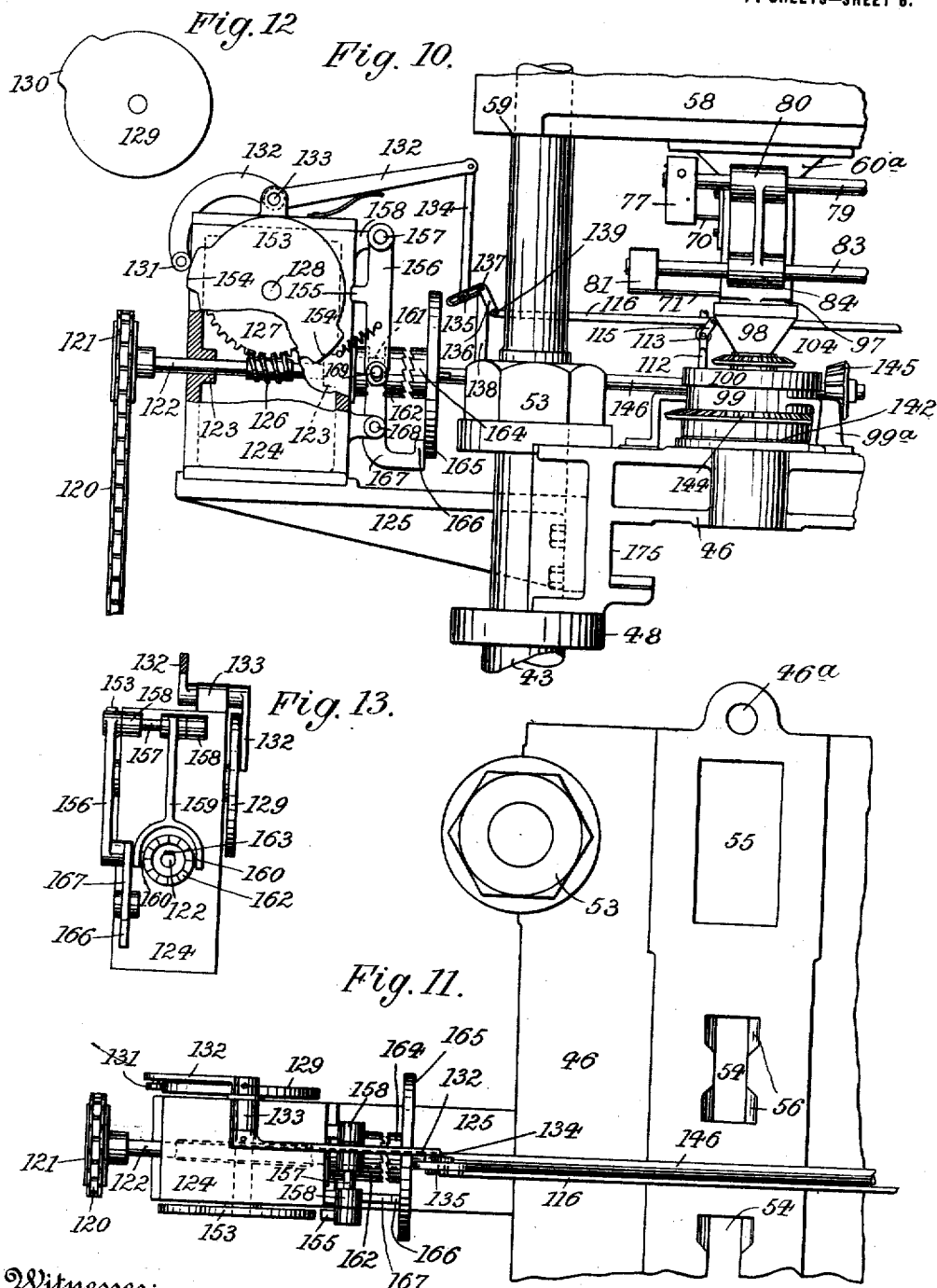

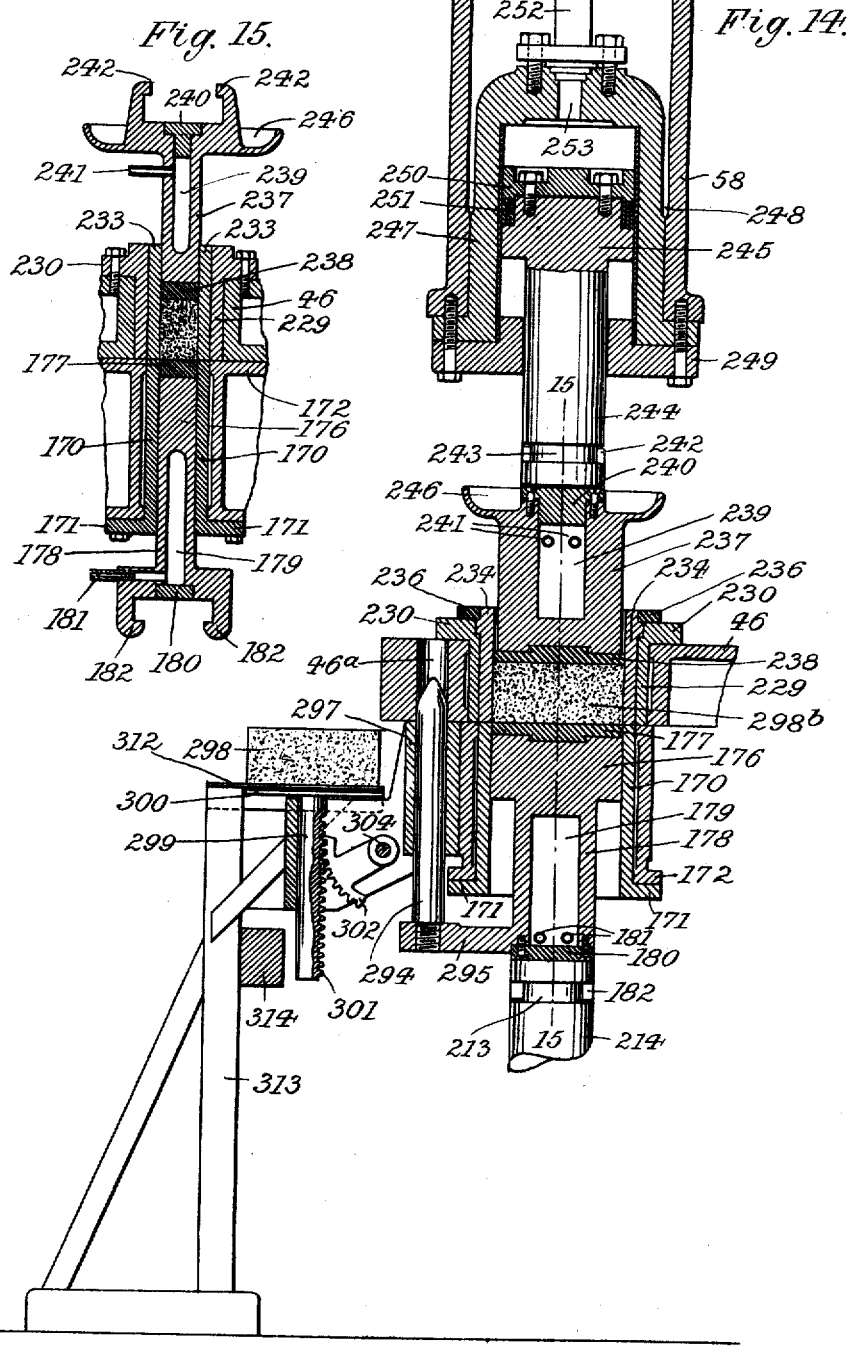

M. H. AVRAM.
BRICK PRESS.
APPLICATION FILED DEC. 10, 1914.
1,239,072.
Patented Sept. 4, 1917.
14 SHEETS—SHEET 8.
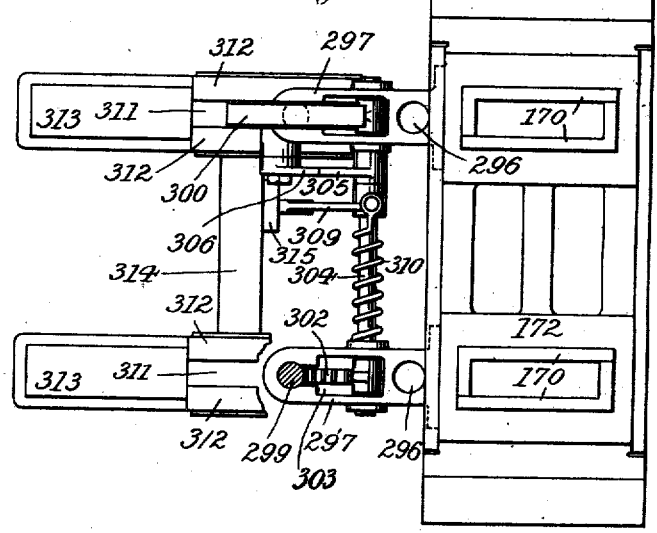
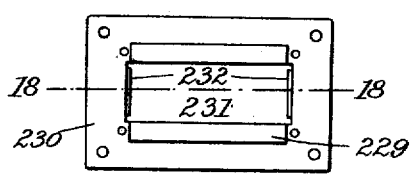
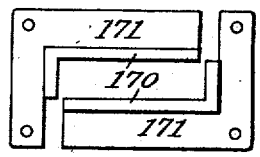
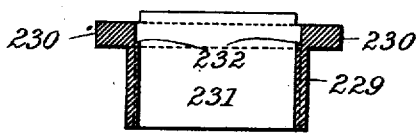
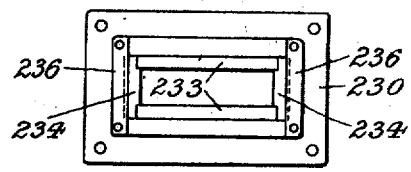
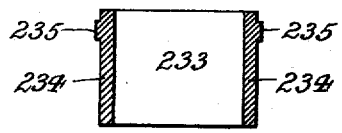
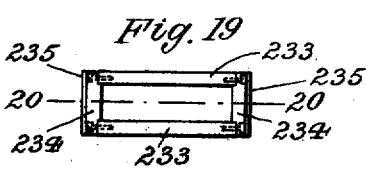
Witnesses:
Edward Schorr.
W. R. Schulz.
Inventor
Mois H. Avram
By his Attorney
Arthur E. Juniper.

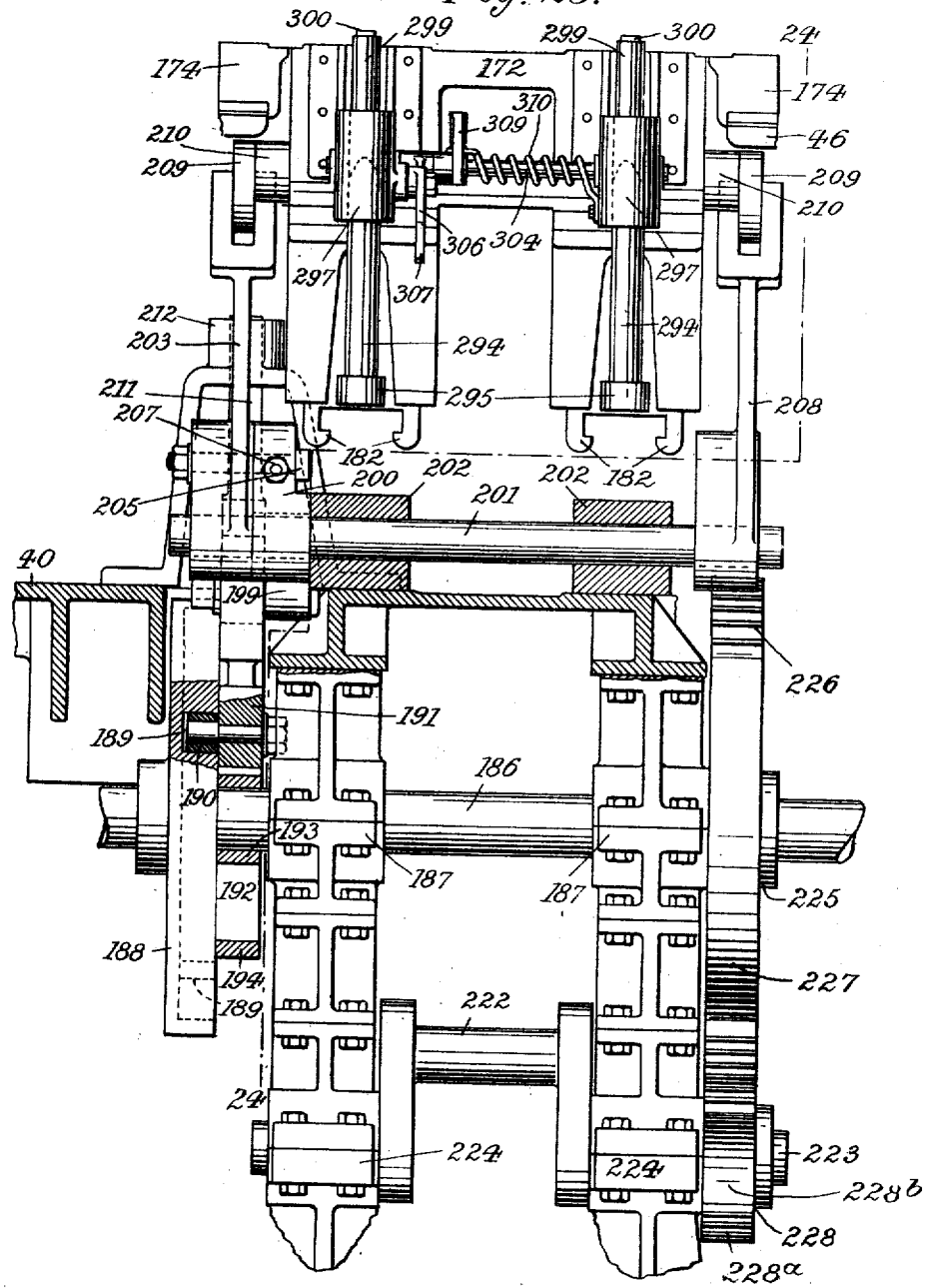

M. H. AVRAM.
BRICK PRESS.
APPLICATION FILED DEC. 10, 1914.

1,239,072.

Patented Sept. 4, 1917.
14 SHEETS—SHEET 10.

M. H. AVRAM.
BRICK PRESS.
APPLICATION FILED DEC. 10, 1914.

1,239,072.

Patented Sept. 4, 1917.
14 SHEETS—SHEET 11.

Witnesses:
Edward Dehorr.
W. B. Schulz.

Inventor
Mois H. Avram
By his Attorney
Arthur E. Zumpe.

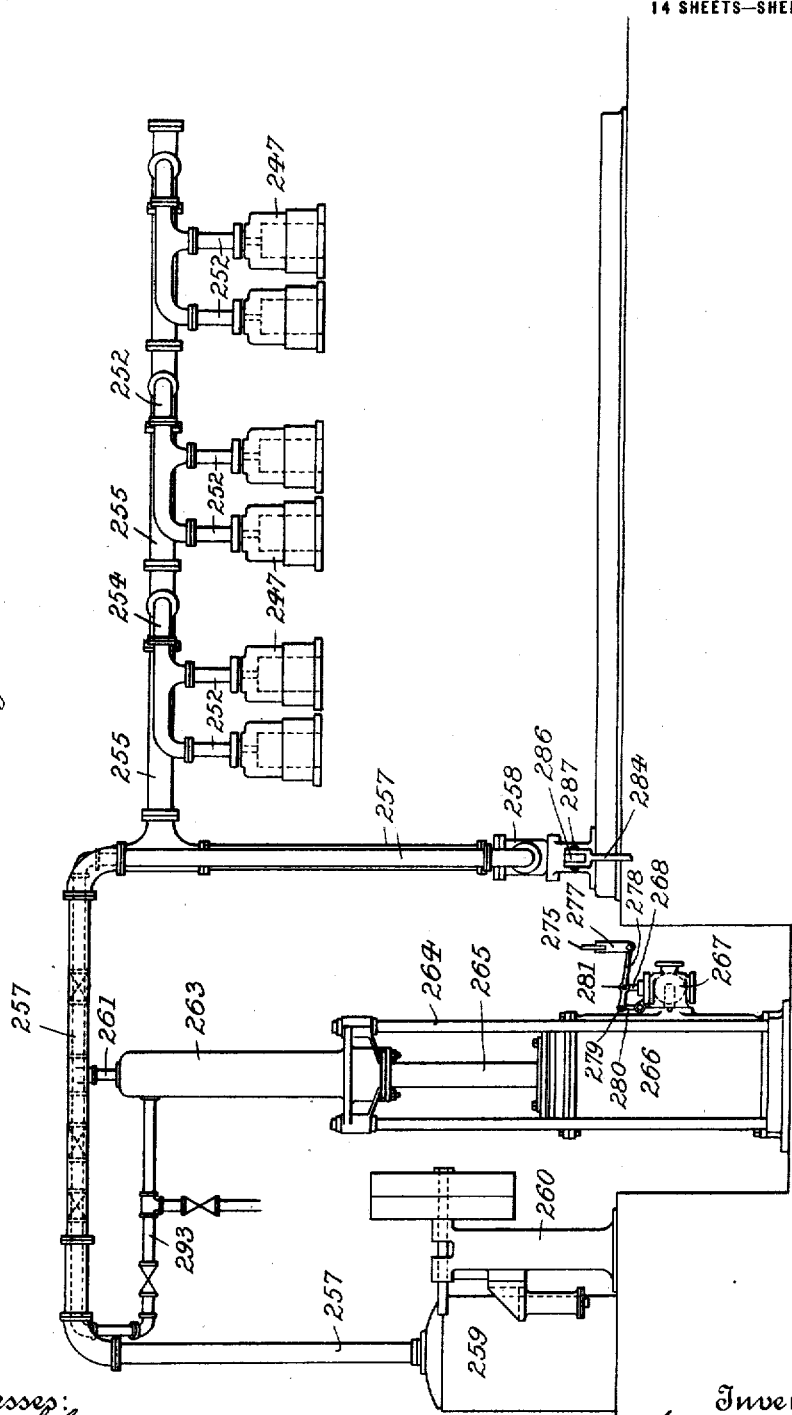

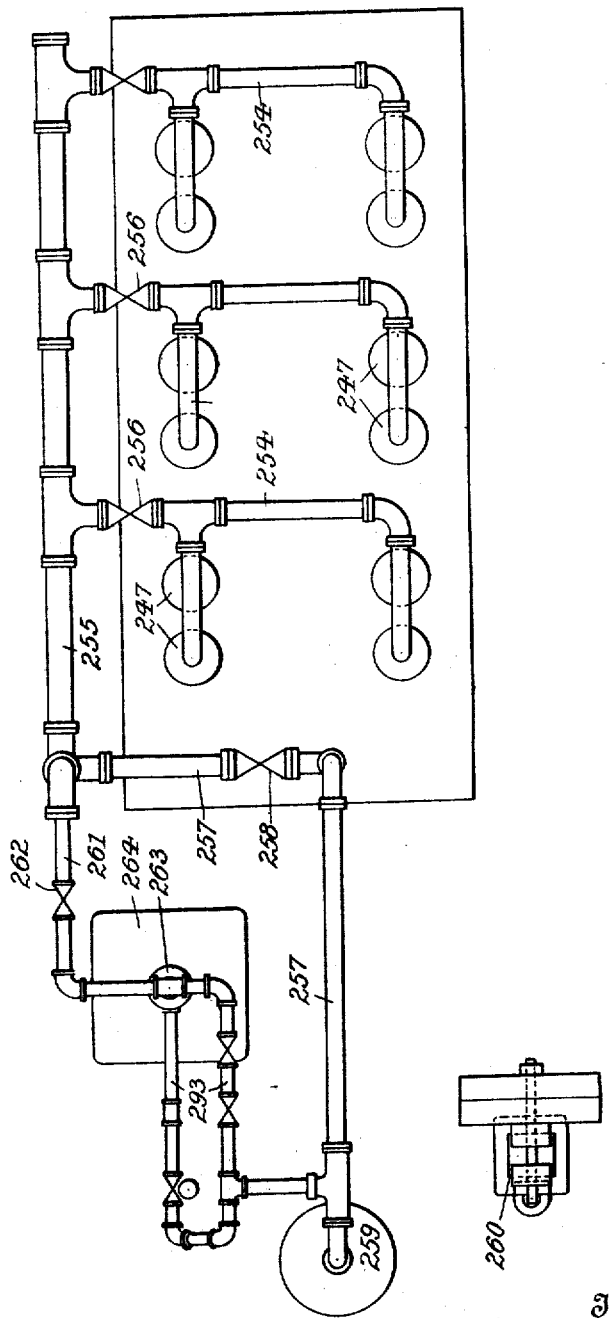

M. H. AVRAM.
BRICK PRESS.
APPLICATION FILED DEC. 10, 1914.

1,239,072.

Patented Sept. 4, 1917.
14 SHEETS—SHEET 14.

Witnesses:
Edward Schorr
H. B. Schulz

Inventor
Mais H. Avram
By his Attorney
Arthur E. Jumper

UNITED STATES PATENT OFFICE.

MOÏS H. AVRAM, OF NEW YORK, N. Y., ASSIGNOR TO STANDARD SILICA BRICK MACHINERY COMPANY, OF WILMINGTON, DELAWARE.

BRICK-PRESS.

1,239,072.  Specification of Letters Patent.  Patented Sept. 4, 1917.

Application filed December 10, 1914. Serial No. 876,580.

*To all whom it may concern:*

Be it known that I, Moïs H. Avram, a citizen of the United States, residing at New York city, county and State of New York, have invented certain new and useful Improvements in Brick-Presses, of which the following is a specification.

This invention relates to an improved machine or press for manufacturing bricks which is more particularly adapted for carrying out the method of making artificial stone described in a copending application, filed by me April 5th, 1909, under Serial No. 487,920. The main feature of this method consists in separating from a previously prepared dry mixture of various ingredients, such partial quantities as are just sufficient for the production of single bricks. For this purpose, my improved machine is provided with a suitable number of measuring or weighing devices, the number of which corresponds to that of the molds in which compression takes place. Each of these measuring devices separates automatically from the bulk of the dry mixture, a quantity which is just sufficient for making a single brick or block. After this separated quantity has been discharged from the measuring device, it is conveyed to a miniature mixer, in which moisture is added to the material, preferably in the form of hot water or steam. The plastic mass thus formed is then introduced into a suitable mold, in which it is pressed into the shape desired.

A further object of my invention is to effect a high compression of the material in a short time and to permit the escape of the inclosed air, so as to produce a dense brick of great mechanical resistance. If air is permitted to remain within the finished product the latter will show cracks running through the same, or even if cracks will not show, tests will readily prove the weakness of such blocks. In order to produce dense blocks of great resistability, I apply to the plastic mass a preliminary comparatively low mechanical pressure and a subsequent comparatively high hydraulic pressure, as will hereinafter be more fully described.

My invention also comprises certain other novel features of construction, as are more fully pointed out in the following specification and claims, reference being had to the accompanying drawings, in which:

Figure 1:
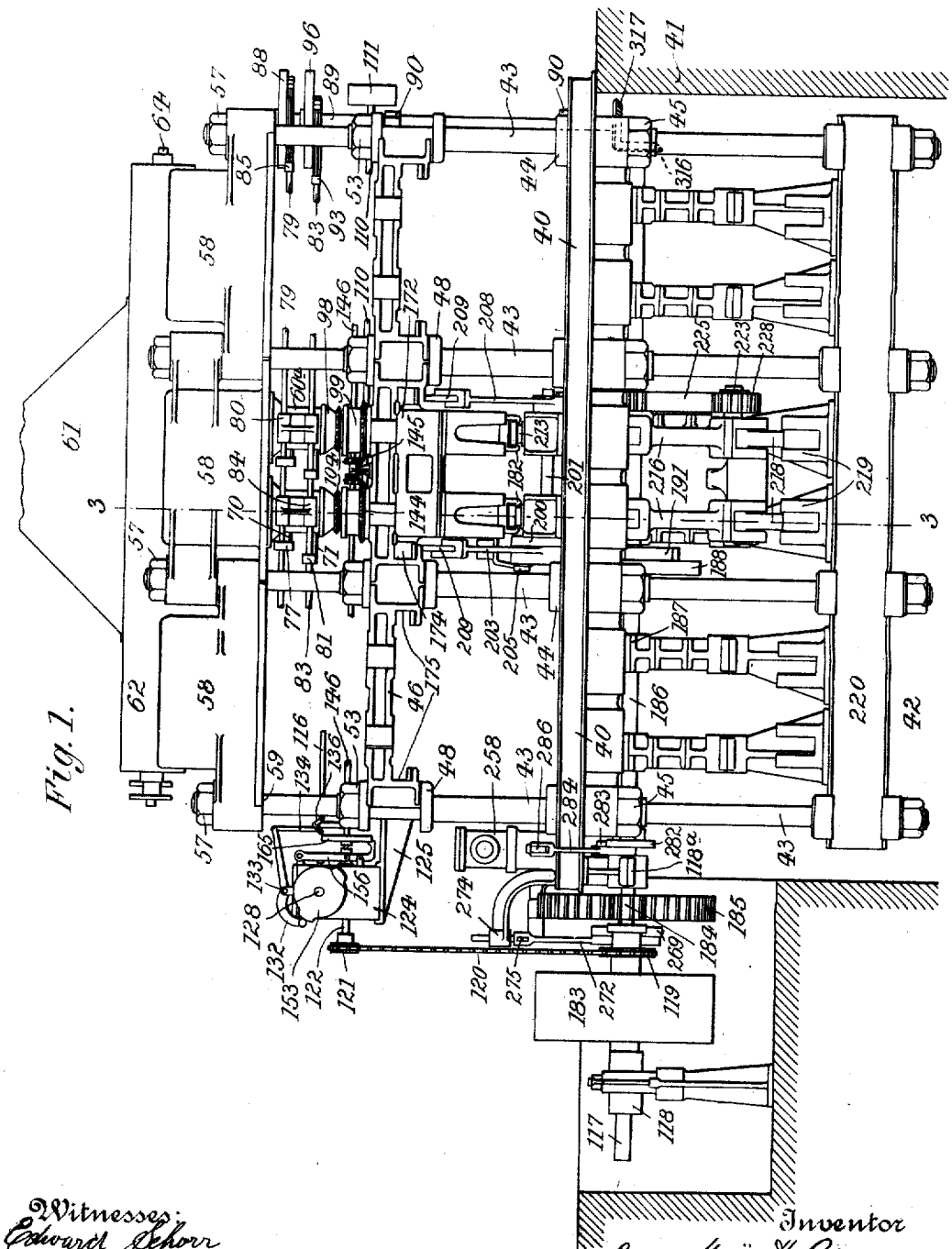
Figure 1 is a front elevation of my improved press, comprising three mold-units, with the hydraulic device and some of the other parts omitted.
Figure 2:
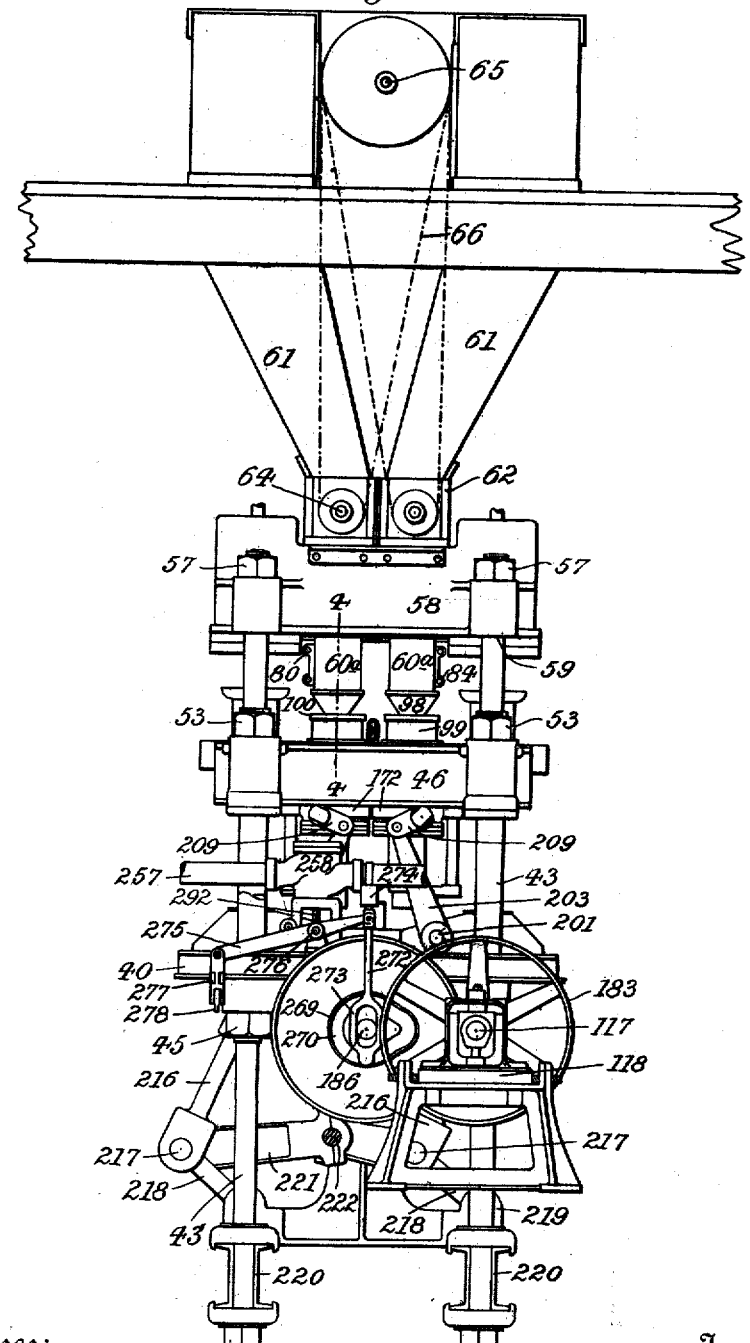
Fig. 2 is a side elevation thereof, with some of the parts omitted.
Figure 3:
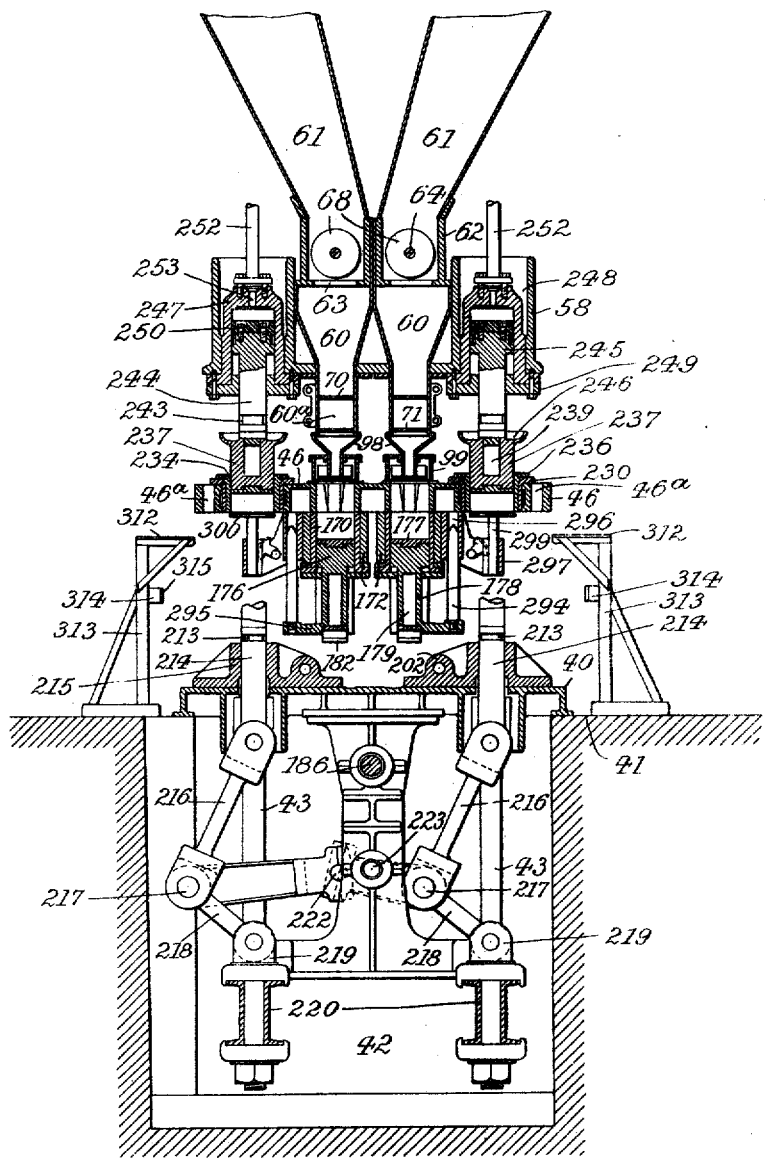
Figure 4:
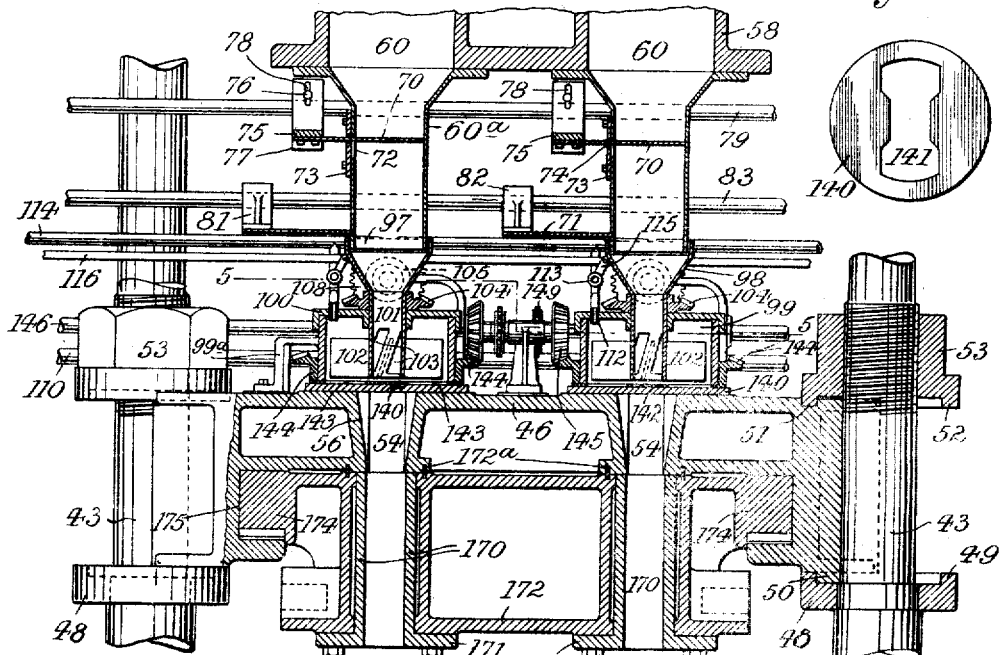
Figure 5:
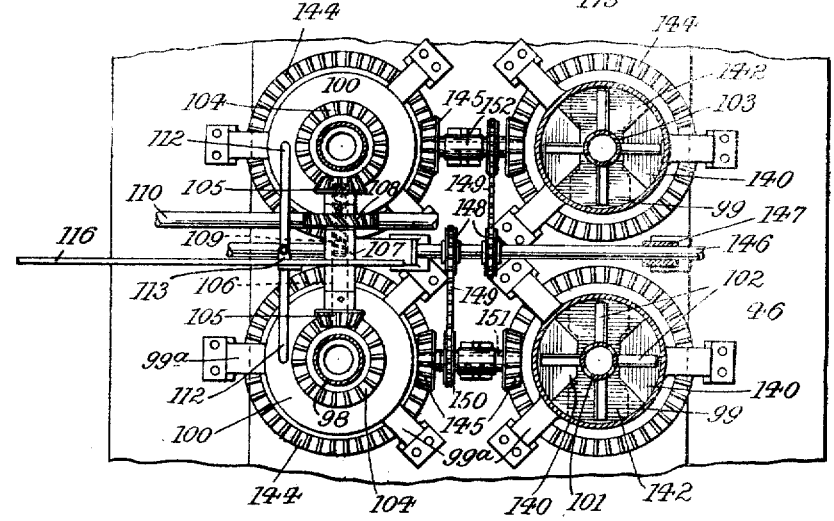
Figure 24:
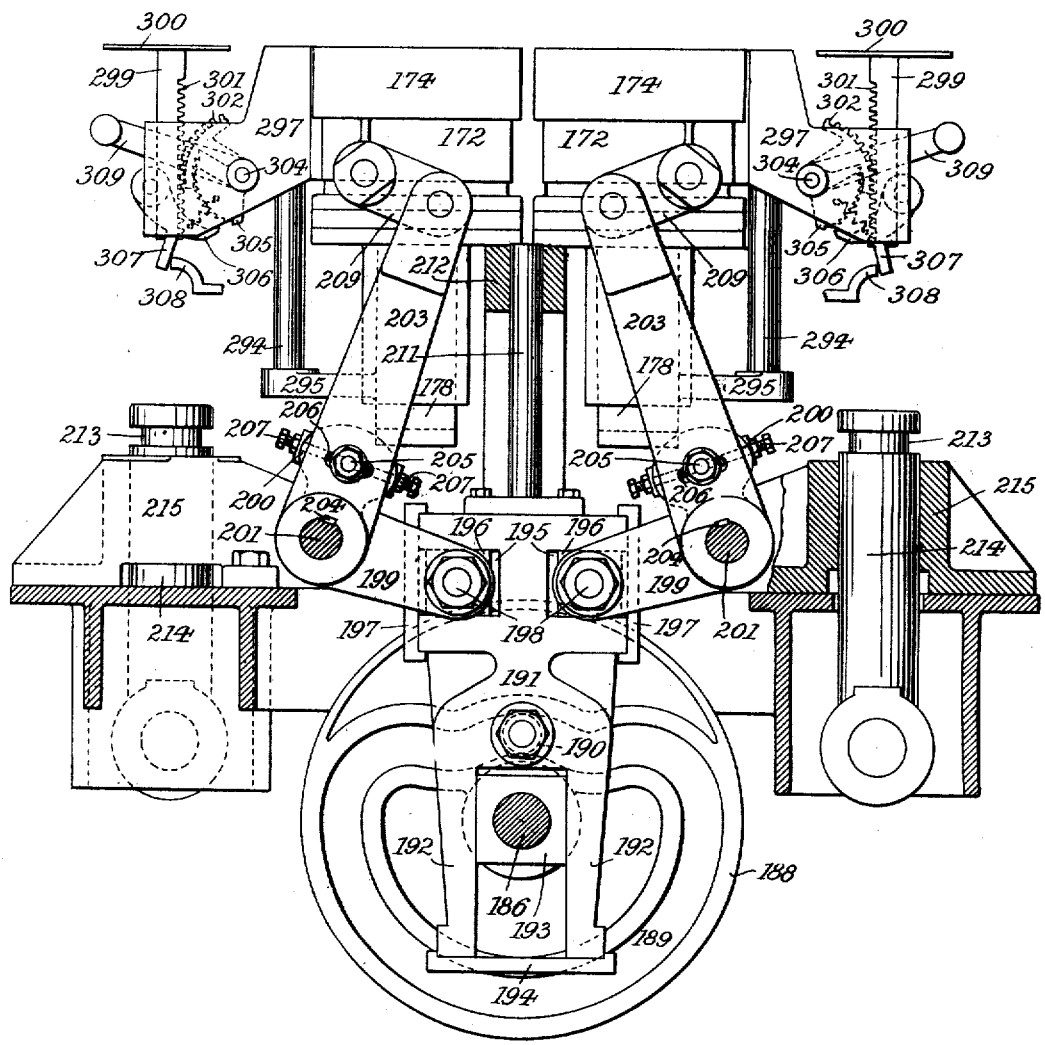
Figure 25:
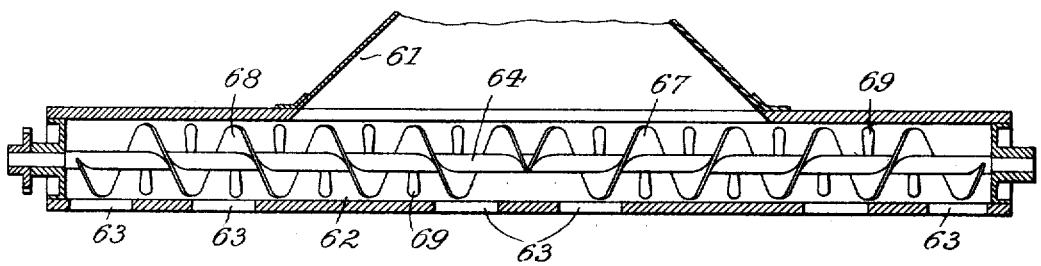
Figure 27:
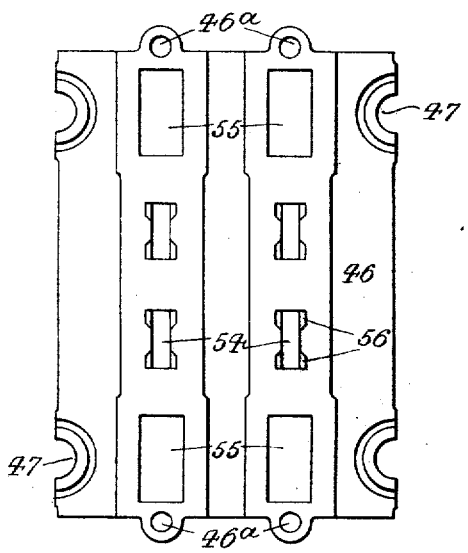
Figure 26:
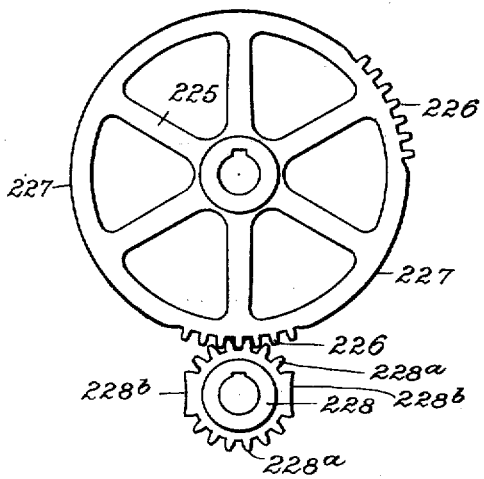
Figure 30:
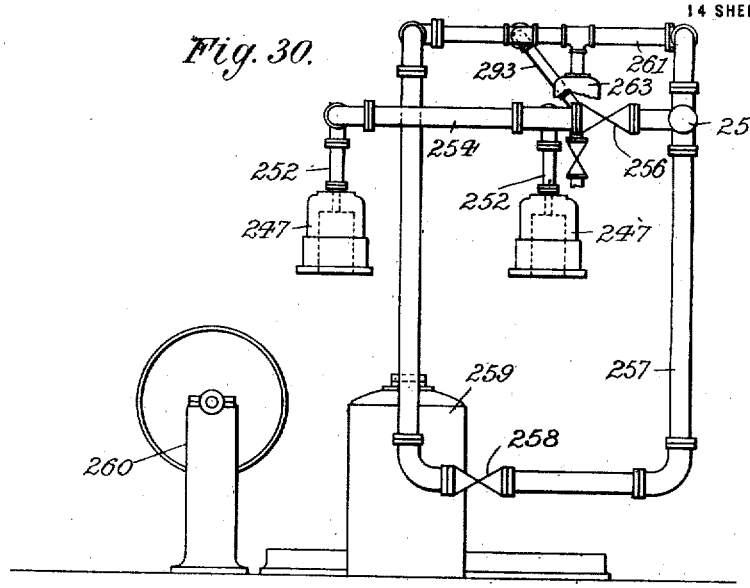
Figure 31:
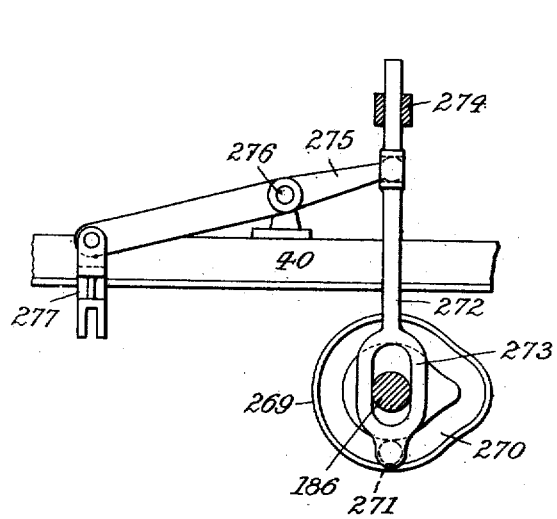
Figure 32:
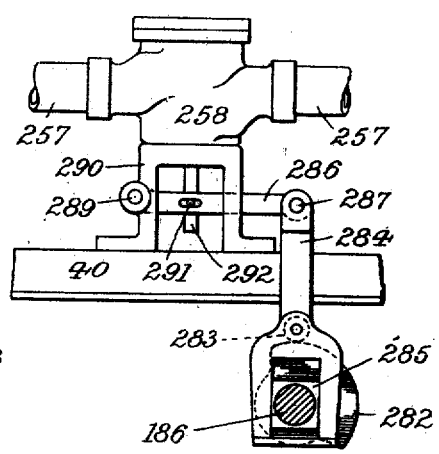

Fig. 3 a vertical cross section on line 3—3, Fig. 1, showing the receiving frame in position;

Fig. 4 an enlarged vertical section on line 4—4, Fig. 2;

Fig. 5 a horizontal section on line 5—5, Fig. 4;

Fig. 5ᵃ a detail of the bottom plate of one of the mixers;

Fig. 6 a front view of the measuring device and adjoining parts;

Fig. 7 a horizontal section on line 7—7, Fig. 6;

Fig. 8 a side view of a frame for supporting the upper slide;

Fig. 9 a similar view of a frame for supporting the lower slide;

Fig. 10 a front view of the means for controlling the moisture supply and for actuating the mold discharge gates;

Fig. 11 a plan view of Fig. 10, with some of the parts omitted;

Fig. 12 a detail of the cam controlling the moisture supply;

Fig. 13 an end view of the regulator proper;

Fig. 14 an enlarged vertical section through one set of plungers and adjoining parts;

Fig. 15 a vertical section on line 15—15, Fig. 14;

Fig. 16 a plan view, partly broken away, of one of the mold carriers and adjoining parts;

Fig. 17 a plan of the upper mold frame;

Fig. 18 a vertical section on line 18—18, Fig. 17;

Fig. 19 a plan of the upper mold proper;

Fig. 20 a vertical section on line 20—20, Fig. 19;

Fig. 21 a plan, showing the assembled mold-frame and mold;

Fig. 22 a plan of the lower mold, showing its sections detached;

Fig. 23 a front view, partly in section, of one of the mold carriers, illustrating the means for reciprocating the same;

Fig. 24 a vertical section on line 24—24, Fig. 23;

Fig. 25 a vertical longitudinal section through one of the feed spirals and adjoining parts;

Fig. 26 a side view of one of the intermittent gears for actuating the toggle joints;

Fig. 27 a plan of one of the frames supporting the mold carriers;

Fig. 28 a diagrammatic front view of the hydraulic device;

Fig. 29 a plan view thereof;

Fig. 30 a left hand end view of said device;

Fig. 31 a detail of the mechanism for actuating the steam intensifier;

Fig. 32 a detail of the mechanism for actuating the hydraulic main valve.

Figure 33:
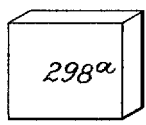

Fig. 33 a perspective view of the contents of one mold before compression takes place.

Figure 34:
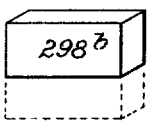
Figure 35:
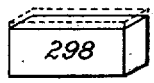

Fig. 34 a perspective view of a partly compressed brick, showing its shape after the preliminary compression, and Fig. 35 a similar view of the completed brick.

The numeral 40 indicates the bed-plate of the machine, which is supported upon a suitable foundation 41 provided with a pit 42 adapted for accommodating the lower parts of the machine. Within a suitable number of perforations of bed-plate 40, are received upright posts 43 arranged in a pair of parallel rows and rigidly secured to said plate by collars 44 and nuts 45. Posts 43 are so spaced that between each pair of transversely alined posts, one mold-unit comprising four molds may be accommodated. The drawing shows three of such mold-units, but it is obvious that either less or more of said units may be incorporated in one press.

Each mold-unit comprises a substantially rectangular frame 46 provided along each transversely flanged edge with a pair of semicircular recesses 47 which are adapted for the reception of posts 43. Frames 46 are firmly supported upon collars 48 carried by posts 43 and provided with annular flanges 49 which embrace corresponding semi-annular lower flanges 50 of frame 46. At its upper side, frame 46 is provided with semi-annular recesses 51 adapted for the reception of the lower flanges 52 of clamping nuts 53.

Each frame 46 has two pair of alined rectangular inner openings 54 and two pair of outer rectangular openings 55 alined with the inner openings 54. Inner openings 54, having sloping wall sections 56, are devised for conveying the moistened material from the miniature mixers to the movable lower molds, while openings 55 are adapted for receiving the upper stationary molds, as will be hereinafter more fully described.

To the upper ends of posts 43 is secured by nuts 57, a sectional top frame 58, the several frame-sections resting upon off sets or steps 59 of said posts. Within frame 58 are formed a series of chutes 60 arranged in two parallel rows, each of said chutes being vertically alined with one of the openings 54. Chutes 60 are adapted for the conveyance of the dry ingredients used for forming the desired blocks. These ingredients are intimately mixed in predetermined proportions in suitable mixers which are not shown and do not form part of the present invention. From these mixers the dry material is fed through suitable chutes 61 into conveyer boxes 62, one of the said boxes being arranged vertically above each row of chutes 60. Each box 62 communicates through corresponding openings 63 with chutes 60, as illustrated in Figs. 3 and 25. Within box 62 is rotatably mounted a spindle 64 driven from a power shaft 65 by a suitable chain 66, or otherwise. Spindle 64 is provided with a right hand spiral conveyer 67 and left hand spiral conveyer 68 which distribute the dry mixed material evenly toward both ends of the box. If desired, spindle 64 may be provided with suitable beaters 69 to insure a thorough intermixture of the material.

Chutes 60 communicate at their lower ends with boxes 60ª containing suitable measuring or weighing devices, each of said devices being adapted for separating such a quantity from the dry mixture as is just sufficient for forming a single brick.

The measuring device is shown to consist of an upper inlet slide 70 and a lower outlet slide 71 which are adapted to be projected into boxes 60ª. Slides 70 and 71 receive an intermittent reciprocative movement in opposite directions, so that when slides 71 are projected into the chutes while slides 70 are withdrawn therefrom, the material descending from boxes 62 will fill the space above the slide 71. Slides 70 are then projected into boxes 60ª, whereupon slides 71 are withdrawn to permit the discharge of the material previously defined between upper and lower slides into the miniature mixer hereinafter described.

In order to permit a ready regulation of the quantity of the dry material thus discharged, so as to adapt the machine to various kinds and compositions of materials, the distance between the lower and upper slides is made adjustable. For this purpose, each upper slide 70 passes through a comparatively large opening 72 of box 60ª. the said opening being closed by a vertically adjustable plate 73. Plate 73 is provided with a narrow horizontal slot 74 which is adapted for the accommodation of slide 70. The slides 70 of each pair of transversely alined boxes 60ª are secured to a U-shaped cross frame 75 and secured by screws 76 to a pair of arms 77, said screws passing through vertical slots 78 of frame 75. Arms 77 are mounted upon a pair of parallel longitudinal shafts 79 guided in suitable bearings 80. In order to adjust the distance between the upper and lower slides, screws 76, as well as the screws securing plate 73 to box 60ª, are loosened and after properly setting slides 70, the screws are again tightened. The lower slides 71 of each pair of alined boxes 60ª are carried by U-shaped cross frames 81 having eyes 82 which are secured to a pair of parallel shafts 83 guided within bearings 84 and arranged vertically below shafts 79.

In order to intermittently reciprocate shafts 79, together with slides 70, the right hand ends of said shafts are connected by a traverse 85 provided with a cam roller 86 which is received within a corresponding groove 87 of a cam disk 88. The latter is secured to an upright shaft 89 which is rotatably mounted in bearings 90 and receives motion in manner hereinafter described. In order to properly guide traverse 85 during its reciprocation it is provided with a pair of parallel extensions or arms 91 that straddle a squared block 92 loosely mounted upon shaft 89.

In like manner, lower shafts 83 are connected by a traverse 93 carrying a cam roller 94 that engages the groove 95 of a cam disk 96 secured to shaft 89, the traverse 93 forming in all respects a duplicate of traverse 85. Grooves 87 and 95 are so cut that the traverses 85, 93, and consequently the slides 70, 71 receive an intermittent reciprocative movement in opposite directions, special care being taken that the lower slides begin their receding movement only after the upper slides have been fully projected into boxes 60ª.

Each box 60ª is provided with a lower tubular end section 97 which is loosely embraced by a rotary hopper 98 adapted for conveying the material into a miniature mixer 99. The latter is supported upon frame 46 by a suitable number of brackets 99ª, and is closed at its top by a flanged cover 100. Within a central perforation of cover 100 is guided the lower tubular section 101 of hopper 98, (Fig. 4). Section 101 carries a suitable number of inclined mixing blades or arms 102 between which openings 103 are formed within section 101, said openings permitting the passage of the dry material from hopper 98 into mixer 99. Each hopper 98 receives rotary motion by means of a beveled gear wheel 104 secured thereto and engaging a similar gear wheel 105 mounted upon a transverse shaft 106 which is journaled in a suitable bearing 107. To shaft 106 is secured a skew spur wheel 108 meshing into a similar wheel 109 which is keyed to a longitudinal shaft 110. The latter receives continuous rotary motion from a pulley 111, or in any other suitable manner.

While the mixed dry ingredients sufficient for molding one block are discharged from each hopper 98 into the coöperating mixer 99, the necessary amount of moisture, which has been ascertained by previous tests, is added thereto, said moisture being preferably added in the form of steam or hot water, The moisture is admitted through a pipe 112 passing through cover 100 of mixer 99 and being provided with a cock 113 that controls communication between pipe 112 and a supply pipe 114, which is, in turn, connected to a suitable boiler or tank (not shown). Each cock 113 regulates the moisture supply of two alined mixers 99 and is provided with an arm 115 which is pivotally connected to a longitudinal rod 116. The latter receives intermittent reciprocative movement, so that during each reciprocation of rod 116, all cocks 113 are once opened and closed.

Rod 116 is controlled by a regulator illustrated in Figs. 10 to 13, and receiving motion from a power shaft 117 hereinafter referred to, said shaft being supported within suitable bearings 118 and 118ª. Upon shaft 117 is mounted a chain wheel 119 which, by chain 120, transmits motion to a wheel 121 secured to the spindle 122. The latter is journaled in bearings 123 of a frame or casing 124 supported upon a bracket 125 of frame 46. Upon spindle 122 is rigidly mounted a worm 126 engaging a worm wheel 127 keyed to a shaft 128 which is also journaled in casing 124. The movement of shaft 128 is so timed that the shaft makes one complete rotation during the formation of each block. Shaft 128 carries a cam disk 129 having a raised cam section 130 which is adapted to be engaged by a cam roller 131 carried by one arm of a spring-influenced lever 132, said lever being fulcrumed at 133 to casing 124. The other arm or lever 132 is, by link 134 and bolt 135, adjustably connected to one arm of a bell crank 136 which is fulcrumed at 137 to a suitable standard 138. To the other arm of bell crank 136 is pivoted at 139 one end of rod 116. The parts described are so dimensioned and timed, that during the completion of one block, shaft 128 makes one revolution, so that all cocks 113 are once opened during each rotation of shaft 128. By varying the distance of screw 135 from fulcrum 137, the extent to which cocks 113 are opened may be readily adjusted, thereby regulating the amount of moisture admitted into the mixers 99.

After the material contained within each mixer 99 has been thoroughly moistened and agitated to form a uniform plastic mass, the latter is discharged into openings 54 of frame 46 hereinabove referred to. For this purpose, each mixer 99 is provided with a stationary bottom plate 140 having a pair of alined apertures 141 that register with one of the openings 54. Above plate 140 there is mounted a rotary gate 142 provided with a pair of diametrically opposed openings 143 made in the form of a quadrant and being adapted to communicate with apertures 141. During the mixing operation, apertures 141 are closed by the imperforate sections of gate 142, while, in order to subsequently discharge the mixed and moistened mass, gate 142 is rotated through 90°, so that openings 143 will register with apertures 141.

For operating gates 142, the latter are provided with beveled gear wheels 144 which are engaged by similar wheels 145. The latter receive intermittent rotary movement from a longitudinal shaft 146 rotatably mounted in bearings 147. To shafts 146 are rigidly secured a series of chain wheels 148 which transmit motion, by chains 149, to corresponding wheels 150 mounted upon relatively short spindles 151. Each of these spindles is journaled within a bearing 152 and carries at each end one of the bevel gear wheels 145 hereinabove referred to. Shaft 146 receives intermittent rotary movement from spindle 122 by means of a cam disk 153 secured to shaft 128. This disk is provided with a pair of raised sections 154 which are adapted to be engaged by the nose 155 of a spring-influenced lever 156 keyed to a pintle 157. The latter is journaled in bearings 158 of casing 124 and carries a forked shipping lever 159, the studs 160 of which engage a circumferential groove 161 of a movable clutch-member 162. Member 162 being connected to a spindle 122 by a groove and feather connection 163 is adapted to engage a relatively fixed clutch-member 164 keyed to shaft 146. It will be seen that during each rotation of shaft 128, shaft 146 will be coupled twice to the continuously rotating spindle 122. As the length of each bulge 154 of disk 153 is such that the gates 142 operated thereby made a quarter of a revolution during the engagement of such bulge with nose 155, it will be readily understood that the gate is first closed and then opened during the formation of each block, so as to permit a proper mixing and moistening of the ingredients, and a subsequent discharge of said ingredients into openings or chutes 54.

In order to effect an immediate arrest of shaft 146 after nose 155 clears one of the bulges 154, there is secured to said shaft a brake-disk 165. The latter is adapted to be engaged by the shoe 166 of a brake-lever 167 which is fulcrumed to a casing 124 as at 168. The upper arm of lever 167 is pivotally connected to a lever 156 as at 169, so that when movable clutch-member 162 is thrown into engagement with fixed member 164, shoe 166 is withdrawn from disk 165. As soon as nose 155 clears one of the bulges 154, lever 156 will be retracted by its spring, thereby throwing shoe 166 against disk 165 to stop its rotation.

The material intermittently discharged from mixers 99, in the manner described, descends by gravity through chutes 54, to enter the lower molds which are temporarily brought into vertical alinement with said chutes. Each of these lower molds comprises essentially a pair of L-shaped sections 170 provided with flanges 171, (Fig. 22). Molds 170 are received within corresponding apertures of a carrier 172, to the bottom of which they are secured by screws 173. In order to prevent the material from entering between parts 46 and 172, longitudinal rails 172$^a$ are provided which are countersunk in one part and slide in a corresponding groove of the other part.

Each of the mold units hereinabove referred to comprises two mold carriers, while, in turn, each carrier contains two molds 170. Carrier 172 is provided with a pair of transverse rails 174 which slidably engage corresponding guideways 175 of frames 46. The lower end of each mold 170 is closed by an oblong plunger 176 provided with an exchangeable face plate 177. Plunger 176 has a depending stem 178 provided with an oblong cavity 179 which is closed at its bottom by plate 180. Into cavity 179 opens a pair of pipes 181 which may be used for the supply and discharge of steam if it is found necessary to heat plungers 176. Stem 178 is furnished at its lower end with a pair of opposed hooks or claws 182, for a purpose hereinafter set forth.

After the temporary contents of each mixer 99 have thus been conveyed into molds 170, carriers or feeding members 172 are moved outward, so as to bring said molds into vertical alinement with the compressing means. These means consist essentially of a lower toggle joint which is adapted to be operatively connected to plunger 176, and of an upper hydraulic plunger which is set in operation after the toggle joint has been straightened out, so as to afford a reliable bottom support during the final compression, as will be hereinafter more fully described.

The means for reciprocating carriers 172 are as follows:—

Power shaft 117, which receives rotary movement through pulleys 183, or otherwise, carries a toothed wheel 184 which meshes into a corresponding wheel 185 secured to a counter-shaft 186. The latter extends throughout the entire length of the machine and is mounted in suitable bearings 187 which constitute part of the frame work of said machine, shaft 186 making one complete rotation during the formation of each block.

For each mold-unit, there is secured to shaft 186 a disk 188 provided with a cam groove 189. Groove 189 is engaged by a roller 190 carried by a yoke 191 having a pair of depending arms 192 that straddle a squared block 193 which loosely embraces shaft 186. Arms 192 are connected at their lower ends by a transverse plate 194, (Fig. 24). The upper section of yoke 191 is provided with a pair of horizontally alined recesses 195, each of said recesses accommodating a squared block 196. At their outer ends recesses 195 are closed by end plates 197. To each block 196 is fulcrumed by screw-bolt 198, the arm 199 of an elbow lever 199, 200 which is loosely mounted upon one end of a shaft 201. The latter is journaled in suitable bearings 202 secured to bed plate 40. The arm 200 of each elbow lever is adjustably connected to a shipping lever 203 which is rigidly secured to shaft 201 by a key 204. The adjustable connection consists of a screw-bolt 205 passing through a perforation of lever 203 and engaging a corresponding slot 206 of a lever-arm 200. In order to permanently maintain bolt 205 in its position after having been properly set, a pair of alined screws 207 are tapped into arm 200 which bear, from opposite directions, against bolt 205. At its other end shaft 201 is provided with a relatively fixed lever 208, as shown in Fig. 23. The upper forked ends of levers 203 and 208 are connected by links 209 to a pair of axially alined studs 210 of carriers 172. It will be seen that the continuous rotation of shaft 186 will cause a vertical reciprocation of yoke 191, which movement is insured by the engagement of a pin 211, extending upwardly from said yoke, with a fixed bearing 212. The reciprocation of yoke 191 will, by oscillating levers 199, 200 and 203 result in a horizontal reciprocation of mold carriers 172, as will be readily understood.

While carriers 172, together with their charged molds 170, are moved outward, in the manner described, the hooks 182 of each plunger 176 enter a circumferential groove 213 of a piston 214 guided in a corresponding bore of a casting 215 that forms part of bearing 202. To the lower end of each piston 214 is fulcrumed the upper forked end of an upper toggle bar 216, the lower end of which is pivotally connected by pin 217 to the lower toggle bar 218. The lower end of bar 218 is journaled in a suitable bearing 219 supported upon longitudinal beams 220 which are secured to the lower ends of posts 43. The pins 217 of the toggle joints are engaged by the outer ends of links 221, the inner ends of which embrace the cranks 222 forming part of shafts 223. Each shaft 223 is journaled in suitable bearings 224 and receives intermittent rotary motion from countershaft 186 hereinabove referred to. For this purpose shaft 186 is provided (for each mold-unit) with a mutilated gear wheel 225 comprising a pair of toothed sections 226 and a pair of intervening blank sections 227, (Figs. 23 and 26). Gear wheel 225 is adapted to engage a mutilated pinion 228 fast on shaft 223, said pinion having a pair of toothed sections 228$^a$ and a pair of intervening concave sections 228$^b$, the curvature of which equals that of sections 227. In this way, during each rotation of shaft 186, shaft 223 makes two intermittent partial rotations. The relative diameters of wheels 225, 228, and the lengths of their toothed sections are such that during each complete rotation of shaft 186, one complete rotation is imparted to shaft 223. While shaft 223 is at rest, it is locked against accidental movement by the engagement of concave sections 228$^b$ with convex sections 227.

The above movement of shaft 223 is so timed that while carriers 172 move outward, toggles 216, 218 are in their collapsed position, (Figs. 2 and 3), so that hooks 182 of plungers 175 are free to enter grooves 213 of pistons 214. In the outward position of the carriers the lower molds 170 are vertically alined with stationary upper molds seated within openings 55 of frame or mold table 46. Each upper mold comprises essentially an oblong frame 229, the flange 230 of which rests upon the top of frame 46, to which it is secured by screws or otherwise. Frame 229 is provided with an oblong opening 231 and with a pair of shoulders 232. Within opening 231 is received a mold proper which is preferably composed of two pairs of parallel plates 233, 234, which are connected by screws, as illustrated in Fig. 19. Plates 234 are provided with transverse ribs 235 that engage shoulder 232, while suitable clamping bars 236, which engage the top of ribs 235, prevent an accidental disengagement of molds 233, 234 from frame 229. Within the upper molds 233, 234 are slidably mounted hydraulically actuated plungers 237 which are provided with lower exchangeable face plates 238. Each plunger 237 has a central cavity 239 which is closed at the top by a cover 240. Into cavity 239 open a pair of pipes 241 that may be used for the admission and discharge of a suitable heating medium. At its upper end plunger 237 is provided with a pair of opposed hooks 242 adapted to engage a corresponding circumferential groove 243 of the depending stem 244 of a hydraulic piston or ram 245. A suitable tray 246, formed at the top of plunger 237 receives any drippings resulting from leakage of the hydraulic device. Piston 245 plays within a bell-shaped copper lined cylinder 247 which is fitted into a corresponding bore 248 of top frame 58. Cylinder 247 is closed at its bottom by a plate 249 having a central perforation for accommodating stem 244, such perforation permitting also the entrance and discharge of the atmospheric air during the play of the piston. The latter is provided at its top with a plate 250, between which and piston 245 there is confined the usual U-shaped leather gasket 251. The pressure liquid is admitted into cylinder 247 through a pipe 252, said pipe communicating with the interior of the cylinder.

As the hydraulic device does not form part of the present invention, it is shown only diagrammatically in Figs. 28, 29 and 30, and its description may accordingly be abbreviated. The pipes 252 of each mold-unit are connected to a branch 254 of a main pipe 255, communication between the latter and each branch 254 being controlled by a suitable valve 256. Main pipe 255 is, by conduit 257 controlled by valve 258, connected to a tank 259 in which a constant air pressure is maintained by a suitable air compressor 260. Main pipe 255, is, by branch 261 which is controlled by a valve 262, connected to the upper or water cylinder 263 of a steam intensifier 264. The lower end of plunger 265 which plays within cylinder 263 carries a piston (not shown) which is received within the lower or steam cylinder 266 of intensifier 264. The admission of steam into cylinder 266 is controlled by an inlet valve 267 connected to a suitable steam supply (not shown). Spindle 268 of valve 267 is operated from countershaft 186 by means of a cam disk 269 rigidly secured to said shaft and having a groove 270. The latter is engaged by a roller 271 carried by the lower end of a vertically reciprocative rod 272 having an eye 273 that embraces shaft 186. At its upper end rod 272 is guided in a corresponding fixed bearing 274. To rod 272 is pivotally connected one end of a two-arm lever 275 fulcrumed at 276 to bed-plate 40. The other end of lever 275 is, by link 277, connected to a lever 278 which is fulcrumed at 279 to a link 280 hinged to the casing of valve 267. To lever 278 is pivotally connected at 281 valve spindle 268, so that during each rotation of shaft 186 valve 267 will be once opened and closed.

Valve 258, hereinabove referred to, is also operated from countershaft 186, for which purpose the latter is provided with a relatively fixed cam 282, the periphery of which is engaged by a cam roller 283 carried by a rod 284, the lower forked end of which straddles a squared block 285 loosely fitted upon shaft 186. The upper forked end of rod 284 is hinged at 287 to a lever 286 which is fulcrumed at 289 to an inverted U-shaped support 290 upon which valve 258 is mounted. Lever 286 is, at 291, operatively connected to the spindle 292 of valve 238, so that during each rotation of shaft 186, valve 258 will be once opened and closed.

The piping 293 for starting the hydraulic device and for replenishing the water has been incorporated in the drawings to illustrate a complete and operative plant, but as this device does not form part of the present invention, its description is deemed unnecessary.

During the compression of the plastic mass through plungers 176 and 237, the mold carriers 172 are locked in position by pins 294 screwed into arms 295 which project outwardly from stems 178. These pins are guided in perforations 296 of brackets 297 which are firmly attached to carriers 172. Pins 294 enter corresponding perforations 46ª of frame 46 when the plungers 176 ascend.

For receiving the compressed bricks 298 from the upper molds, there are slidably mounted in corresponding apertures of brackets 297, the stems 299 of vertically reciprocative delivery tables or supports 300. Each stem 299 is provided with a longitudinal rack 301 which is engaged by a toothed sector 302, accommodated within a slot 303 of bracket 297. The two sectors 302 of each mold carrier 172 are secured to a spindle 304 journaled within brackets 297. Upon each spindle 304 there is rigidly mounted a serrated sector 305 which is adapted to be engaged by a spring-influenced pawl 306. The latter is pivotally connected to one of the brackets 297 and has a depending arm 307, in the path of which is arranged a stationary abutment 308 secured to the machine frame in any suitable manner. Upon spindle 304 is further rigidly mounted an arm 309, while a spring 310 coiled around said spindle and secured to bracket 297 and arm 309, respectively, tends to rotate spindle 304 in such a direction that tables 300 and arm 309 are brought into their raised position.

During the outward movement of carriers 172, each stem 299 is accommodated within a corresponding slot 311 formed between a pair of parallel rails 312 upon which the finished brick 298 is transferred from table 300. Rails 312 form part of a suitable frame 313, two adjoining frames 313 being connected by a cross bar 314. The latter is provided with an abutment 315 which is adapted to be engaged by an arm 309. The width of table 300 is slightly less than that of slot 311, while the width of the latter is slightly less than that of the brick. It will thus be seen that after a brick has been deposited upon table 300, the former will project beyond the longitudinal edges of the latter. When, however, table 300 together with the brick, is moved outward, to be received within slot 311, and when said table is subsequently lowered, as will be hereinafter more fully described, the brick will rest with its longitudinal lower edges upon rails 312.

As above stated, countershaft 186 extends through the entire length of the machine, (Fig. 1). At its right end, shaft 186 carries a miter wheel 316 meshing into a similar wheel 317 which is mounted upon shaft 89, so that continuous rotary motion is imparted to the latter from countershaft 186.

The operation of my improved press is as follows:—

The properly mixed dry ingredients are continuously fed into conveyer boxes 62 from which they enter measuring boxes 60ª through chutes 60. Slides 70 and 71 which receive movement in the manner above described, are so timed that they lag slightly behind each other, i. e., the lower slide should be closed before the upper slide is opened, and the upper slide should be closed before the lower slide is opened. For admitting fresh charges into boxes 60ª, the lower slides 71 are first closed whereupon upper slides 70 are opened. The dry material descending through chutes 60 will thus fill the space above the slides 71, whereupon, in due time, slides 70 are projected into boxes 60ª, thus confining in each measuring device such a quantity of the dry mixed ingredients as is just sufficient for the formation of a single brick.

After the material has thus been measured, slides 71 are retracted to permit the discharge of the material into hoppers 98 which receive continuous rotary movement in the manner above described. The material discharged from each measuring device is then thrown through openings 103 of lower hopper section 101 into the miniature mixer 99. While the dry mass thus enters the mixers, moisture is admitted thereto through pipes 112 by opening cocks 113, all of which are simultaneously actuated by shipping rod 116, which movement is controlled by regulator 124. After the proper predetermined quantity of moisture has been applied to the mixture, cocks 113 are closed and the mass is thoroughly agitated, whereupon gates 142 are opened, the movement of said gates being also controlled by regulator 124. The plastic mass will thus descend through chutes 54 of mold table 46 into lower molds 170, where it will rest upon plungers 176, the discharge of the mass from mixers 99 being facilitated by the continued rotation of the stirring blades 102. After the proper quantity of moistened material has been received within molds 170, the oblong opening of which constitutes a feed opening, carriers 172 are shifted outward, which movement is controlled by cams 188, yokes 191, elbow levers 199, 200, shipping levers 203, 208 and links 209. In this way, lower molds 170 have become vertically alined with upper molds 233, 234. During this outward movement of the carriers, the hooks 182 of plungers 176 have entered grooves 213 of rams 214, which are in their lower-most position owing to the collapsed state of toggles 216—218. At this stage of the operation, the hydraulic plungers 237 are in their lower-most position, so that the lower faces of plates 238 are flush with the lower faces of frames 46. As valve 258 is now open, as will hereinafter be more fully described, plungers 237 are under influence of a pressure which depends upon the air pressure maintained within tank 259.

One of the toothed sections 226 of each wheel 225 will now come into engagement with one of the toothed sections 228ª of pinion 228, so that crank shaft 223 will be rotated through an angle of 180° to be subsequently locked by the engagement of wheel-sections 227, 228ᵇ. During this rotation of shaft 223, toggles 216, 218 have become straightened out, so that the coöperating members 216, 218 of each toggle joint have been brought into vertical alinement.

Owing to this movement of the toggles, plungers 176 have been raised into their uppermost position, (Fig. 14), in which the upper sides of facings 177 are flush with the upper sides of carriers 172. During its upward movement, each plunger 176 had to overcome the combined action of the weight of plunger 237 and ram 245, and of the hydrostatic pressure acting upon ram 245. The resistance thus offered against the ascent of plunger 176 results in a preliminary compression of the plastic mass confined between plungers 176, 237. Brick 298ª has thus been reduced to the size 298ᵇ illustrated in Fig. 34.

To bring the preliminary compressed brick 298ᵇ into its final shape 298, (Fig. 35), the hydraulic ram 245 is operated, the alined toggles 216, 218, serving as brick supporting means during this operation. For effecting the final compression, valve 258 is closed and valve 267 is opened to admit steam into cylinder 266 and to cause the corresponding ascent of plunger 265. The high hydraulic pressure thus produced in cylinder 263, and consequently in cylinder 247, will cause a corresponding descent of ram 245 and plunger 237, to bring the brick into its final shape, whereupon valve 267 is again closed.

Toggles 216, 218 are now collapsed to cause the descent of plungers 176 and the withdrawal of pins 294 from sockets, 46ª, which pins previously locked carriers 172 in position. Carriers 172 are next returned into their original inner position, so that delivery tables 300, which have been raised in manner hereinafter described, arrive beneath molds 233, 234. Valve 258 is now opened, to admit the hydrostatic pressure of tank 259 to the top of rams 245. The latter will thus descend to force the finished products out of molds 233, 234 and to deposit them upon tables 300. The latter will thus participate in the downward movement of rams 245 against the action of springs 310. In the meantime molds 170 have again been loaded in the manner described, whereupon carriers 172 are moved outward to repeat the operation described.

During this outward movement of carriers 172, delivery tables 300 are maintained in their lowered position owing to the engagement of pawls 306 with ratchet sectors 305. During the last part of said movement of carriers 172, arms 309 come into engagement with abutments 315, so as to cause a slight further descent of tables 300, whereby the bricks 298 are deposited upon rails 312, from which they are removed by hand or otherwise.

During the last part of the subsequent inward movement of carriers 172, arms 307 bear against abutments 308, thereby withdrawing the pawls 306 from ratchets 305. Springs 310, which are thus liberated, are now free to return tables 300 into their raised position ready for the reception of the next finished brick.

It will be seen that my improved brick press has important advantages over the presses hitherto known. As almost all of the various feed channels, measuring devices, etc., are traversed by dry materials there is no possibility of these channels, etc., becoming clogged. As furthermore, the dry mixture delivered to the miniature mixers is treated either with steam or with hot air, all complicated heating devices are dispensed with and the plastic material formed will neither adhere to the walls of said mixers nor to the small feed channels that deliver said mass to the molds.

A further advantage of my improved press is, that the dry ingredients may be kept for any length of time before and after being intermixed, without binding agents losing their cementing properties. As the small quantities separated from the dry mixture are moistened immediately before being molded, the materials have no time to set previous to the molding operation.

By combining a preliminary mechanical compression with a subsequent hydraulic compression of the bricks, various additional advantages are obtained. By employing a comparatively low preliminary pressure, the air filling the cavities between the intermixed materials has time and occasion to escape. If a high pressure is rapidly applied to a closely confined compressible material, the air inclosed within said material will act as a cushion. Thus, the effect of the compression, instead of being taken up by the material, results in a compression of the inclosed air. If a brick thus produced is subsequently removed from the mold, the inclosed compressed air will cause a cracking of the brick. By first applying a low pressure, the inclosed air has time to escape, which fact is especially true with my improved press, as during this preliminary compression, the mass, as an entirety, is conveyed from the carrier into the mold-opening, so that the air is able to readily escape along the walls of the opening. The finally applied high hydraulic pressure will thus be taken up by the plastic mass after the expulsion of the air. In this way the particles of the mixture will come into close contact, so that a superior binding effect is obtained.

As by the preliminary mechanical compression the bricks are almost reduced to their final size, there is no necessity of feeding large quantities of water for the hydraulic ram. In this way time is saved, damage to the pipes is avoided, and the machine becomes less cumbersome and less jarring than machines which are exclusively operated by hydraulic means.

I claim:—

1. A brick press, comprising a chute, a conveyer adapted to move material from said chute in a plurality of directions, a series of second chutes with which said conveyer communicates, a measuring device located below each of said second chutes, a miniature mixer located below each measuring device, and a mold coöperating with each mixer.

2. In a brick press, a pair of measuring boxes, slides entering said boxes, a frame carrying said slides, parallel shafts carrying the frame, a traverse connecting said shafts, and means for intermittently reciprocating said traverse.

3. In a brick press, a pair of measuring boxes having side openings, slotted plates adjustably secured to the boxes and covering said openings, slides engaging the plate-slots, a U-shaped frame carrying said slides, a pair of shafts to which said frame is adjustably secured, a traverse connecting said shafts, and means for intermittently reciprocating said traverse.

4. In a brick press, a measuring device, a miniature mixer, a feed hopper communicating with the measuring device and having a lower apertured cylindrical section that projects into the mixer, stirring blades on said cylindrical hopper-section, means for rotating the hopper, and an intermittently rotating discharge gate at the bottom of the mixer.

5. In a brick press, a rectangular mold table having a chute, a miniature mixer located above the chute, a discharge gate controlling communication between said mixer and chute, and means for intermittently actuating said gate.

6. In a brick press, a stationary mold table having a series of chutes, miniature mixers located above the chutes, discharge gates controlling communication between said mixers and chutes, gear wheels carried by the gates, a shaft operatively connected to said gear wheels, and means for intermittently rotating said shaft.

7. In a brick press, a stationary mold table having a series of chutes, miniature mixers located above the chutes, discharge gates controlling communication between said mixers and chutes, moisture supply pipes entering the mixers, cocks controlling said pipes, means for operating the cocks, and means for regulating said operating means.

8. In a brick press, a stationary mold table having a series of chutes, miniature mixers located above the chutes, discharge gates controlling communication between said mixers and chutes, moisture supply pipes entering the mixers, cocks controlling said pipes, a rod operatively connected to the cocks, means for intermittently reciprocating said rod, and means for adjusting the stroke of the rod.

9. In a brick press, a stationary mold table having a chute and mold opening, a miniature mixer located above the chute, a rotary discharge gate controlling communication between the mixer and chute, and a movable carrier located below the mold table and having a feed opening which is adapted to alternately register with said chute and mold opening.

10. In a brick press, a stationary mold table having a chute and a mold opening, a miniature mixer located above the mold, means for intermittently discharging predetermined quantities of dry material and of moisture into said mixer, a rotary discharge gate controlling communication between the mixer and the chute, means for intermittently opening the gate, and a movable carrier located below the mold table and having a feed opening which is adapted to alternately register with said chute and mold opening.

11. In a brick press, a stationary mold table having a pair of guide ways, a carrier movable in said guide ways, an elbow lever linked to said carrier, a yoke operatively connected to said elbow lever, and means for intermittently reciprocating the yoke.

12. In a brick press, a stationary mold table, a carrier slidably engaging the table, a shipping lever linked to said carrier, an elbow lever adjustably connected to the shipping lever, and a reciprocating yoke operatively connected to said elbow lever.

13. In a brick press, a stationary mold table, a carrier slidably engaging said table, a countershaft, a cam disk carried thereby, a yoke operatively connected to said cam disk, an elbow lever operatively connected to the yoke, a shipping lever adjustably secured to the elbow lever, and a link connecting the shipping lever with the carrier.

14. In a brick press, a stationary mold table, a pair of carriers slidably engaging said table, a countershaft, a cam disk carried thereby, a yoke reciprocated by said disk and having a pair of alined recesses, blocks slidable in said recesses, elbow levers bolted to said blocks, shipping levers adjustably connected to the elbow levers, and links connecting the shipping levers with the carriers.

15. In a brick press, a stationary mold table having a mold opening, a movable carrier located below said table, an upwardly acting plunger adapted to force moldable material from said carrier into said mold opening, a toggle joint adapted to actuate said plunger, a downwardly acting hydraulic plunger, and means for alternately connecting said hydraulic plunger to a steam intensifier and to a pressure tank for finally compressing the material and for ejecting the finally compressed material from said mold opening, respectively.

16. In a brick press, a stationary mold table having a chute and a mold opening, a miniature mixer located above the chute, a discharge gate controlling communication between said mixer and chute, a movable carrier located below the mold table and having a feed opening which is adapted to alternately register with said chute and mold opening, an upwardly acting plunger adapted to force moldable material from the feed opening into the mold opening, a toggle joint adapted to actuate said plunger, a downwardly acting hydraulic plunger, and means for alternately connecting said hydraulic plunger to a steam intensifier and to a pressure tank for finally compressing the material and for ejecting the finally compressed material from said mold opening, respectively.

17. In a brick press, a stationary mold table having a chute and a mold opening, a miniature mixer located above the chute, means for discharging a predetermined quantity of dry mixed material into said mixer, means for admitting a predetermined quantity of moisture into the mixer, a discharge gate controlling communication between said mixer and chute, a movable carrier located below the mold table and having a feed opening which is adapted to alternately register with said chute and mold opening, an upwardly acting plunger adapted to force moldable material from the feed opening into the mold opening, a toggle joint adapted to actuate said plunger, a downwardly acting hydraulic plunger, and means for alternately connecting said hydraulic plunger to a steam intensifier, and to a pressure tank for finally compressing the material and for ejecting the finally compressed material from said mold opening, respectively.

18. In a brick press, a stationary mold table having a mold opening, a movable carrier located below said table and having a feed opening which is adapted to register with the mold opening, a plunger engaging the feed opening, a piston adapted to be coupled to the plunger, a toggle joint connected to the piston, a countershaft, a mutilated gear wheel carried thereby, a crank shaft, a mutilated pinion secured to the crank shaft and engaging the mutilated gear wheel, and a link that connects the knee of the toggle joint with said crank shaft.

19. In a brick press, a stationary mold table having a mold opening, a movable carrier located below the mold table, a delivery table movable with the carrier and also vertically movable, a downwardly acting plunger adapted to deposit the contents of the mold opening upon the delivery table, and a fixed receiving frame adapted to coöperate with the delivery table.

20. In a brick press, a stationary mold table, a movable carrier located below said table, a bracket secured to the carrier, a delivery table having a toothed stem which is vertically reciprocable in said bracket, a toothed sector engaging the stem, a shaft carrying said sector, an arm secured to the shaft, a receiving frame adapted to coöperate with the delivery table, and an abutment on said frame which is adapted to be engaged by the arm.

21. In a brick press, a stationary mold table, a movable carrier located below said table, a bracket secured to the carrier, a delivery table having a toothed stem which is vertically reciprocable in said bracket, a toothed sector engaging the stem, a spring-influenced shaft carrying the sector, a ratchet sector secured to the shaft, a pawl engaging the ratchet sector, and a fixed abutment adapted to be engaged by said pawl.

22. In a brick press, a stationary mold table, a movable carrier located below said table, a bracket secured to the carrier, a delivery table having a toothed stem which is vertically reciprocable in said bracket, a toothed sector engaging the stem, a spring-influenced shaft carrying said sector, an arm and ratchet sector secured to the shaft, a pawl fulcrumed to the bracket and engaging the ratchet sector, a frame having a pair of spaced receiving rails adapted for accommodating the stem, a first abutment adapted to be engaged by the arm, and a second abutment adapted to be engaged by the pawl.

23. In a brick press, a stationary mold table having an opening, a flanged open frame fitted into the table opening, a shoulder formed in the frame opening, and a mold fitted into the frame opening and having a rib which is adapted to be seated upon said shoulder.

24. In a brick press, a stationary mold table having an oblong opening, a flanged open frame fitted into the table opening, a shoulder formed in the frame opening, a mold fitted into the frame opening and having a rib which is adapted to be seated upon said shoulder, and a clamping plate removably engaging the rib.

25. In a brick press, a stationary mold table having an oblong opening, a flanged open frame fitted into the table opening, a pair of opposed shoulders formed in the frame opening, a sectional mold fitted into the frame opening and having a pair of ribs that are adapted to be seated upon said shoulders, and a pair of clamping plates removably engaging the ribs.

26. In a brick press, a stationary mold table having a mold opening, a movable carrier below said table and having a feed opening which is adapted to register with the mold opening, an upwardly acting plunger adapted to force moldable material from said feed opening into said mold opening, a toggle joint operatively connected to said plunger, a cylinder, a downwardly acting hydraulic plunger engaging the cylinder and adapted to finally compress and eject said material from the mold opening, a steam intensifier and a pressure tank both being adapted to be connected to the cylinder, a steam valve controlling the steam intensifier, a main valve controlling communication between the pressure tank and the cylinder, a countershaft, and means controlled by said shaft for consecutively actuating the toggle joint, the steam valve and the main valve.

27. In a brick press, a stationary mold table having a mold opening, a cylinder located above said table, a hydraulic plunger engaging the cylinder and mold opening, a steam intensifier adapted to be connected to the cylinder, a valve controlling said intensifier, a countershaft, a cam carried thereby, a reciprocative rod actuated by said cam, and means for operatively connecting the rod to the valve.

28. In a brick press, a stationary mold table having a mold opening, a cylinder located above said table, a hydraulic plunger engaging the cylinder and mold opening, a pressure tank, a valve controlling communication between the pressure tank and cylinder, a countershaft, a cam carried thereby, a reciprocative rod actuated by said cam, and a lever that connects the rod to the valve.

MOÏS H. AVRAM.

Witnesses:
ARTHUR E. ZUMPE,
IDA O. KRUMM.

Copies of this patent may be obtained for five cents each, by addressing the "Commissioner of Patents, Washington, D. C."